US010396589B2

(12) United States Patent
Kamikawa et al.

(10) Patent No.: US 10,396,589 B2
(45) Date of Patent: Aug. 27, 2019

(54) STORAGE-BATTERY CONTROL SYSTEM

(71) Applicant: Panasonic Intellectual Property Management Co., Ltd., Osaka (JP)

(72) Inventors: Takahiro Kamikawa, Osaka (JP); Masayuki Kobayashi, Osaka (JP); Takayuki Mino, Chiba (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 172 days.

(21) Appl. No.: 15/501,976

(22) PCT Filed: Jan. 8, 2016

(86) PCT No.: PCT/JP2016/000071
§ 371 (c)(1),
(2) Date: Feb. 6, 2017

(87) PCT Pub. No.: WO2016/114116
PCT Pub. Date: Jul. 21, 2016

(65) Prior Publication Data
US 2017/0229902 A1    Aug. 10, 2017

(30) Foreign Application Priority Data

Jan. 16, 2015  (JP) ................. 2015-006777
Jun. 17, 2015  (JP) ................. 2015-121612

(51) Int. Cl.
*H02J 7/00*  (2006.01)
*H02J 7/04*  (2006.01)
(Continued)

(52) U.S. Cl.
CPC .............. *H02J 7/04* (2013.01); *G01R 31/387* (2019.01); *H01M 10/425* (2013.01);
(Continued)

(58) Field of Classification Search
CPC ........... A61B 2017/00084; A61B 2018/00744; A61B 2018/00821; A61B 5/03;
(Continued)

(56) References Cited

U.S. PATENT DOCUMENTS

2013/0009466 A1*  1/2013 Kumagai .............. H02J 7/0063
                                                                307/10.1
2013/0076129 A1    3/2013 Kunimitsu et al.
(Continued)

FOREIGN PATENT DOCUMENTS

EP    2565959 A2    3/2013
EP    2574494 A2    4/2013
(Continued)

OTHER PUBLICATIONS

International Search Report of PCT application No. PCT/JP2016/000071 dated Mar. 22, 2016.
(Continued)

*Primary Examiner* — Binh C Tat
(74) *Attorney, Agent, or Firm* — McDermott Will & Emery LLP

(57) ABSTRACT

In a storage-battery control system, an insulating communication unit couples a controller to a battery module constituting a storage battery unit that outputs a predetermined high voltage value. A power supply line is further provided for supplying electric power output from a controller DC/DC, i.e., a controller-side voltage converter for the controller, to the battery module, so that electric power is collectively supplied via the power supply line to a module CPU and a module-side insulating circuit both consuming electric power in the battery module. A secondary battery in the battery module supplies electric power to only a cell-voltage detector.

2 Claims, 6 Drawing Sheets

(51) Int. Cl.
  *G01R 31/387* (2019.01)
  *H01M 10/42* (2006.01)
  *H01M 10/44* (2006.01)
  *H02J 7/02* (2016.01)

(52) U.S. Cl.
  CPC ..... *H01M 10/4207* (2013.01); *H01M 10/441* (2013.01); *H02J 7/0014* (2013.01); *H02J 7/02* (2013.01); *H01M 2220/20* (2013.01); *H02J 7/00* (2013.01); *H02J 7/0065* (2013.01); *H02J 2007/0095* (2013.01); *H02J 2007/0098* (2013.01)

(58) Field of Classification Search
  CPC ................. A61B 5/1076; A61B 18/082; A61F 2007/0249; H02J 7/35; H02J 7/0013; H02J 2007/0067; H02J 7/00; H02J 1/108; H02J 7/0063; H02J 7/008; H02J 3/385; H02J 7/0018; H02J 7/0068; H02J 7/007; H02J 2007/0095; H02J 2007/0098; H02J 7/0014; H02J 7/0065; H02J 7/02; H02J 7/04; E21B 36/003; E21B 47/065; E21B 47/011
  USPC .................................. 320/126–136
  See application file for complete search history.

(56) References Cited

U.S. PATENT DOCUMENTS

| 2013/0106320 | A1  | 5/2013  | Yugo |
| 2013/0271078 | A1  | 10/2013 | Honjo et al. |
| 2014/0097797 | A1* | 4/2014  | Hendrix ............ H01M 2/1077 320/118 |
| 2014/0266051 | A1* | 9/2014  | Hayakawa ........... H02J 7/0016 320/118 |

FOREIGN PATENT DOCUMENTS

| JP | 2013-072817 | 4/2013 |
| JP | 2014-039434 | 2/2014 |

OTHER PUBLICATIONS

Communication pursuant to Rule 164(1) EPC dated Dec. 15, 2017 for the related European Patent Application No. 16737187.1.
The Extended European Search Report dated Apr. 4, 2018 for the related European Patent Application No. 16737187.1.

* cited by examiner

STORAGE-BATTERY CONTROL SYSTEM

TECHNICAL FIELD

The present invention relates to a storage-battery control system.

BACKGROUND ART

Variation in state of charge (SOC) indicating a charged state of each of a plurality of battery modules that is coupled in series and that is used as a single storage battery could restrict charging of one of the battery modules, which has the maximum SOC, as well as could restrict discharging of another one of the battery modules, which has the minimum SOC.

As a cell balance controlling method for straightening SOCs in a plurality of battery modules coupled in series, PTL 1 describes, as a conventional art, a method through which resistors and switching elements are coupled in parallel so as to correspond to respective battery modules to cause one of the battery modules, which has a higher SOC, to discharge electricity by means of corresponding one of the resistors to straighten its SOC with SOCs in the other battery modules.

As a technique relating to the present invention, PTL 2 discloses, as a vehicular power supply device, a configuration including a first measuring circuit for detecting a voltage in a battery for travelling, a second measuring circuit for detecting overdischarging and overcharging, a high voltage power supply that uses electric power supplied from the battery for travelling, a low voltage power supply that uses electric power supplied from a battery for electric components, and an insulating circuit disposed between the respective first and second measuring circuits and electric components. Here, the high voltage power supply supplies electric power to the first and second measuring circuits, while the low voltage power supply supplies electric power to the insulating circuit.

CITATION LIST

Patent Literature

PTL 1: Unexamined Japanese Patent Publication No. 2014-39434
PTL 2: Unexamined Japanese Patent Publication No. 2013-72817

SUMMARY OF THE INVENTION

Technical Problem

SOCs in battery modules are required to be uniform without using an external resistor to consume electric power of the battery modules.

Solution to Problem

A storage-battery control system according to the present invention includes a battery module configuring a storage battery unit for outputting a predetermined high voltage value, a controller, an insulating communication unit coupling the battery module and the controller, and a power supply line. The battery module includes a secondary battery for outputting a module voltage value, a module-side voltage converter for converting a voltage value of the secondary battery into a module-side, predetermined operation voltage value, and module-side circuit elements operating at the module-side, predetermined operation voltage value. The controller includes a low voltage power supply unit, a controller-side voltage converter for converting a voltage of the low voltage power supply unit into a controller-side, predetermined operation voltage value, and a controller-side insulating circuit having a floating reference potential point insulated from a controller reference potential point for the low voltage power supply unit to couple the controller and the insulating communication unit. The power supply line supplies electric power output from the controller-side voltage converter to the battery module.

Advantageous Effects of Invention

According to the above-described configuration, since electric power is supplied from the controller to the battery modules, electric power of the battery modules to be internally consumed by the battery modules themselves can be reduced. Thus, variation in SOC between the battery modules can be suppressed.

DESCRIPTION OF EMBODIMENT

Figure 1:
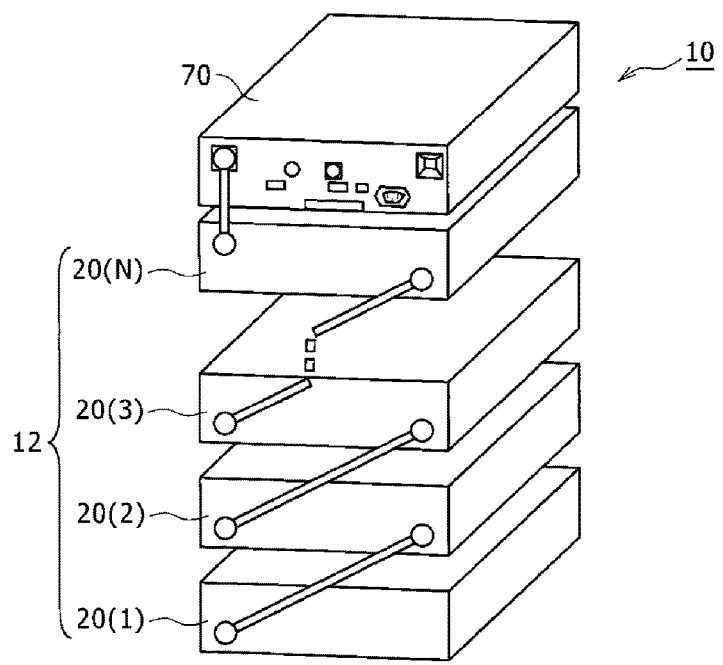
FIG. 1 is an external view of a storage-battery control system according to an exemplary embodiment of the present invention.

Hereinafter, an exemplary embodiment according to the present invention will be described in detail with reference to the drawings. A lithium ion battery is described as a secondary battery configuring a battery module. However, another secondary battery may be used. For example, a nickel hydride battery, a nickel cadmium battery, or another battery may be used. A storage battery unit and a battery module are advantageous for obtaining voltage and current values corresponding to electric power required for a load. Thus, the number of battery modules configuring a storage battery unit, the number of battery cells included in each of secondary batteries configuring the battery modules, and the like may be changed as appropriate depending on specifications of a storage-battery control system. Voltage values and the like described below are merely examples. Such values may be changed as appropriate depending on electric power specifications and the like of a storage-battery control system.

In the following, similar components in all the drawings are denoted by identical reference numerals so as to omit duplicated description. The reference numerals will sometimes be used again as required in subsequent description.

FIG. 1 is a view illustrating a configuration of storage-battery control system 10. Storage-battery control system 10 is a system including storage battery unit 12 combined with a plurality of battery modules 20, and controller 70, and is a system for appropriately controlling charging and discharging of storage battery unit 12.

Storage battery unit 12 is a power storage device configured by coupling a predetermined number of battery modules 20 in series to output electric power at a predetermined high voltage value. In FIG. 1, the predetermined number is set to N, and the number of N of battery modules 20 are stacked in a vertical direction from a bottom to a top when viewed from front, thereby configuring storage battery unit 12 as a stacked body of the battery modules 20. To distinguish each of the number of N of battery modules 20, the numbers are specified as battery module 20(1), 20(2), . . . , 20(N), from a low voltage side at the bottom to a high voltage side at the top of the stacked body.

Battery modules 20 each share and output a module voltage value obtained by dividing with N a high voltage value output from storage battery unit 12. For example, when storage battery unit 12 outputs a high voltage value of 800 V, and N=20, battery modules 20 share and output a module voltage value of (800 V/20)=40 V.

One controller 70 is provided for one storage battery unit 12. In FIG. 1, when N=20, one controller 70 is provided for 20 battery modules 20.

Figure 2:
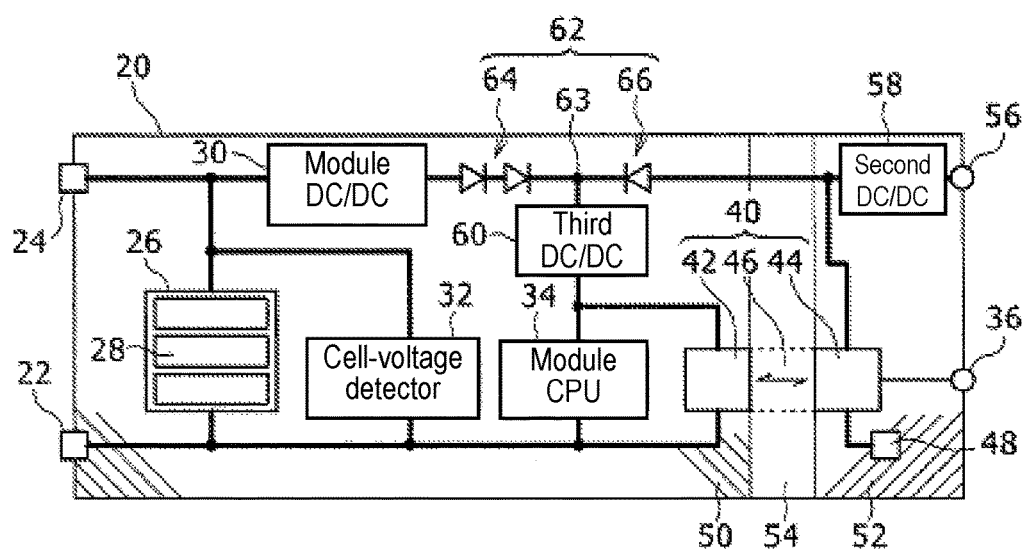
FIG. 2 is a configuration diagram of a battery module configuring the storage-battery control system according to the exemplary embodiment of the present invention.

FIG. 2 is a configuration diagram of one battery module 20. Battery module 20 includes input terminal 22 supplied with electric power output from output terminal (24) of next lower battery module 20 at the lower voltage side, output terminal 24 for supplying output power having a module voltage value that is 40 V higher than a voltage value at input terminal 22 to input terminal (22) of next higher battery module 20 at the higher voltage side, signal terminal 36 for communicating with controller 70, and electric power input terminal 56 for receiving electric power supplied from controller 70.

Battery module 20 includes secondary battery 26 for outputting a module voltage value, module DC/DC 30, cell-voltage detector 32 for detecting a voltage value of secondary battery 26, module CPU 34 for controlling signals for battery module 20 internally, and module-side insulating circuit 40, in addition to second DC/DC 58 for receiving electric power supplied from controller 70, and backflow preventing device 62.

Those elements referred as module-side circuit elements are disposed on a module circuit board. The module circuit board includes high voltage grounding pattern 50 having a module reference potential point regarding a module voltage value, and floating grounding pattern 52 having a floating reference potential point insulated from the module reference potential point. Both the grounding patterns are electrically insulated each other via insulating region 54. Module-side insulating circuit 40 is disposed across these two grounding patterns. Module-side insulating circuit 40 will be described later. The module reference potential point is input terminal 22. The floating reference potential point is grounding terminal 48 at a portion of module-side insulating circuit 40, the portion being disposed on floating grounding pattern 52.

Secondary battery 26 is configured to couple in series a plurality of battery cells 28. An example in FIG. 2 shows a configuration of one secondary battery 26 in which three battery cells 28 are coupled in series. One battery cell 28 has a voltage value of (40 V/3)=13.3 V across terminals. In one battery cell 28, a plurality of unit batteries is coupled in series and in parallel to output predetermined voltage and current values. As a unit battery, a lithium ion battery having a terminal voltage value in a range from 1 V to 4 V inclusive may be used.

Module DC/DC 30 is a module-side voltage converter that partially uses electric power of secondary battery 26 to supply required electric power to the module-side circuit elements in battery module 20, excluding cell-voltage detector 32. An input terminal of module DC/DC 30 is coupled to a positive electrode terminal of secondary battery 26, while an output terminal is coupled to backflow preventing device 62.

Second DC/DC 58 is a voltage converter for adjusting a voltage value of electric power supplied from electric power input terminal 56 to a voltage value appropriate for battery module 20. An input terminal of second DC/DC 58 is coupled to electric power input terminal 56, while an output terminal is coupled to both module-side insulating circuit 40 and backflow preventing device 62.

Third DC/DC 60 is a voltage converter for converting a voltage value of electric power output from module DC/DC 30 or a voltage value of electric power output from second DC/DC 58 into an operation voltage value for module CPU 34 and other components. An input terminal of third DC/DC 60 is coupled to coupling point 63 of backflow preventing device 62, while an output terminal is coupled to a power source terminal of module CPU 34 and module-side insulating circuit 40.

Backflow preventing device 62 is a power supply switch provided between an output side of module DC/DC 30 and an output side of second DC/DC 58, and has a function for supplying, at a normal operation, electric power output from second DC/DC 58 to third DC/DC 60, and for supplying, if second DC/DC 58 does not output electric power, electric power output from module DC/DC 30 to third DC/DC 60.

Backflow preventing device 62 includes module-side rectifying device 64 having an anode coupled to the output side of module DC/DC 30 and a cathode coupled to coupling point 63, and controller-side rectifying device 66 having an anode coupled to the output side of second DC/DC 58 and a cathode coupled to coupling point 63. An on-voltage value for module-side rectifying device 64 is set higher than an on-voltage value for controller-side rectifying device 66. At a normal operation, electric power is therefore supplied from second DC/DC 58 via coupling point 63 to third DC/DC 60. If second DC/DC 58 does not output electric power, electric power is supplied from module DC/DC 30 via coupling point 63 to third DC/DC 60.

Cell-voltage detector 32 is a sensor for detecting a voltage value across terminals of secondary battery 26, for example. Cell-voltage detector 32 may further detect a battery cell voltage value, i.e. a voltage value across terminals of each battery cell 28. Cell-voltage detector 32 is a detector for detecting the battery states of secondary battery 26, such as a current value and a battery cell temperature, in addition to a voltage value. However, cell-voltage detector 32 herein typically detects a battery cell voltage value. Cell-voltage detector 32 is directly coupled to secondary battery 26, without going through module DC/DC 30. A detected battery cell voltage value and other values are sent to controller 70 via module CPU 34, module-side insulating circuit 40, and signal terminal 36.

Module CPU 34 is a module-side controlling circuit for controlling battery module 20 internally. A signal control includes converting a battery cell voltage value and other values sent from cell-voltage detector 32 into values appropriate for processing in controller 70, and obtaining an SOC indicating a state of charge in secondary battery 26.

Module-side insulating circuit 40 is a transmitting circuit for transmitting data output from module CPU 34 to controller 70. The reason why module-side insulating circuit 40 is provided is a difference between a module grounding potential, i.e., a reference potential for battery module 20, and a controller grounding potential, i.e., a reference potential for controller 70.

Module-side insulating circuit 40 includes primary circuit unit 42 that lies on high voltage grounding pattern 50, secondary circuit unit 44 that lies on floating grounding pattern 52, and insulating band 46 disposed between primary circuit unit 42 and secondary circuit unit 44. Examples of widely known insulating circuit types include a magnetic coupling type using a transformer, a capacitance coupling type using two opposing electrodes, and an optical coupling type using a photo-coupler. A bidirectional photo-coupler type is used herein as module-side insulating circuit 40. A bidirectional photo-coupler is capable of an outward transmission to transmit from battery module 20, and a return reception to receive at battery module 20, and includes two photo-couplers. That is, primary circuit unit 42 is provided with an outward transmission LED and a return reception photodiode, while secondary circuit unit 44 is provided with an outward reception photodiode and a return transmission LED. Insulating band 46 is a separated space or a member made of a light pervious resin.

Figure 3:
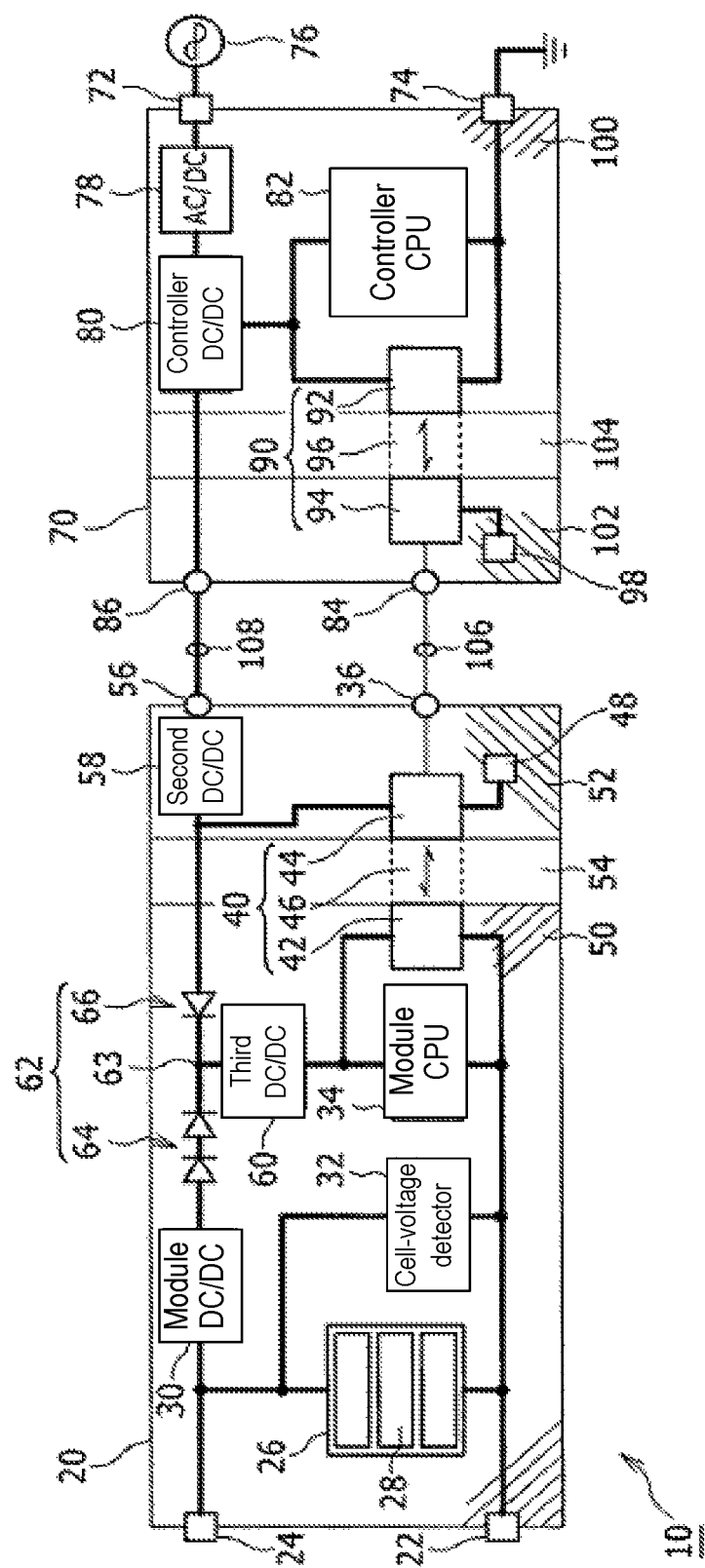
FIG. 3 is a view illustrating a single battery module and a controller coupled to each other, according to the exemplary embodiment of the present invention.

FIG. 3 is a view illustrating a coupling relationship between one battery module 20 and controller 70. A configuration of controller 70 will now mainly described herein because battery module 20 has already been described with reference to FIG. 2.

Controller 70 is a controlling circuit for controlling charging and discharging of storage battery unit 12. Controller 70 includes power source terminal 72 coupled to external commercial power supply 76, grounding terminal 74 coupled to a point having a grounding potential of 0 V on storage-battery control system 10, signal terminal 84 for communicating with module-side insulating circuit 40 in battery module 20 via insulating communication unit 106, and electric power output terminal 86 for supplying electric power to second DC/DC 58.

Between adjacent battery modules 20, the plurality of battery modules 20 each is daisy-chain coupled via module-side insulating circuit 40, so that the plurality of battery modules 20 and controller 70 exchange various data and control signals.

Controller 70 includes AC/DC power converter 78 indicated as AC/DC, controller DC/DC 80, controller CPU 82, and controller-side insulating circuit 90.

AC/DC power converter 78 is a low voltage power supply unit for converting AC power supplied from external commercial power supply 76 into DC power at a predetermined DC voltage value.

Controller DC/DC 80 is a controller-side voltage converting circuit for converting a DC voltage value of DC power output from AC/DC power converter 78 into an operation voltage value for controller CPU 82 and controller-side insulating circuit 90. If an operation voltage value of controller CPU 82 differs from an operation voltage value of controller-side insulating circuit 90, for example, DC power output from AC/DC power converter 78 may be supplied to controller-side insulating circuit 90, while DC power output from controller DC/DC 80 may be supplied to controller CPU 82. Controller DC/DC 80 is further coupled to electric power output terminal 86 to supply, via power supply line 108, electric power to second DC/DC 58 in battery module 20.

Controller CPU 82 is a controlling circuit for controlling signals in controller 70 internally to provide necessary control instructions to battery modules 20 configuring storage battery unit 12.

These circuit elements are disposed on a controller circuit board. The controller circuit board includes low voltage grounding pattern 100 having a controller reference potential point for controller CPU 82, and floating grounding pattern 102 having a floating reference potential point insulated from a controller low voltage reference potential point. Both the grounding patterns are electrically insulated each other by insulating region 104. Controller-side insulating circuit 90 is disposed across low voltage grounding pattern 100 and floating grounding pattern 102.

Controller-side insulating circuit 90 includes primary circuit unit 92 that lies on low voltage grounding pattern 100, secondary circuit unit 94 that lies on floating grounding pattern 102, and insulating band 96 disposed between primary circuit unit 92 and secondary circuit unit 94. Similarly to module-side insulating circuit 40 described with reference to FIG. 2, controller-side insulating circuit 90 uses an optical communication insulating circuit of bidirectional photo-coupler type.

A controller reference potential point is grounding terminal 74. The floating reference potential point, i.e., a reference potential point on floating grounding pattern 102, is grounding terminal 98 disposed on floating grounding pattern 102 of controller-side insulating circuit 90.

Because electric power output terminal 86 of controller 70 and electric power input terminal 56 of battery module 20 are coupled with power supply line 108, electric power is collectively supplied from controller 70 to circuit elements, i.e., module CPU 34 and module-side insulating circuit 40, excluding cell-voltage detector 32, which consume electric power in battery module 20 internally. Because only the minimum electric power value is required, for cell-voltage detector 32, to be supplied from secondary battery 26 to battery module 20 internally, secondary battery 26 can output, as the maximum electric power value, its stored electric power value from which the minimum electric power value is subtracted, from output terminal 24. An internal power consumption value that leads to variation in SOC between battery modules 20 can thus be kept minimum. As a result, the variation in SOC in battery modules 20 can be suppressed without using an external resistor in order to consume electric power.

Figure 4:
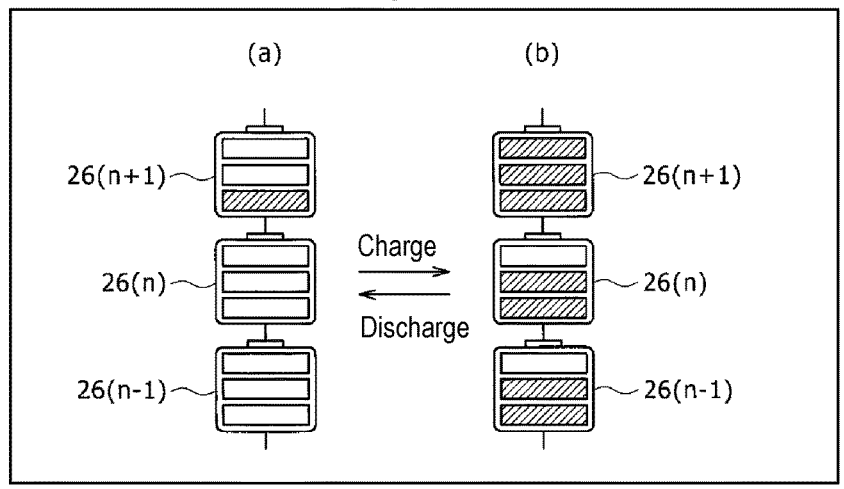
FIG. 4 is a view illustrating variation in SOCs of secondary batteries in a plurality of battery modules, in which the section (a) of FIG. 4 is a view illustrating amounts of SOCs in the secondary batteries in the respective battery modules during discharging, and the section (b) of FIG. 4 is a view illustrating amounts of SOCs in the secondary batteries in the respective battery modules during charging.

The above-described effects will now be described in detail with reference to FIGS. 4 to 6. FIG. 4 includes views illustrating variation in SOC between the plurality of battery modules 20 coupled in series each other. Here, the views illustrate with shaded areas amounts of SOCs in secondary batteries 26(n+1), 26(n), and 26(n−1) in three consecutive battery modules 20(n+1), 20(n), and 20(n−1), among 20 battery modules 20 coupled in series in storage battery unit 12 shown in FIG. 1. The section (a) of FIG. 4 is a view schematically illustrating amounts of SOCs in secondary batteries 26(n+1), 26(n), and 26(n−1) during discharging. The section (b) of FIG. 4 is a view schematically illustrating amounts of SOCs in secondary batteries 26(n+1), 26(n), and 26(n−1) during charging.

The section (a) of FIG. 4 shows that, during discharging, secondary batteries 26(n) and 26(n−1) are fully discharged, i.e., SOC=0%, but, in secondary battery 26(n+1), SOC remains to 33.3%. That is, stored electric power equivalent to such SOC is neither discharged nor used.

When charging is performed at this state, the charging is restricted in secondary battery 26 having the maximum SOC. As shown in the section (b) of FIG. 4, the charging as a result ends when secondary battery 26(n+1) is fully charged, while SOC of secondary battery 26(n) and SOC of secondary battery 26(n−1) remain 66.6%. That is, these batteries are not fully charged without fully utilizing their power storing capabilities.

When discharging is performed at this state, the discharging is restricted in secondary battery 26 having the minimum SOC. As shown in the section (a) of FIG. 4, secondary batteries 26(n) and 26(n−1) are as a result fully discharged, i.e., SOC=0%, while SOC of secondary battery 26(n+1) still remains 33.3%. Thus, stored electric power equivalent to such SOC is neither discharged nor used.

If variation arises in SOC between the plurality of battery modules 20 coupled in series each other as described above, a power storing capability of storage battery unit 12 cannot fully be utilized. Even if all secondary batteries 26 in battery modules 20 are fully charged when storage battery unit 12 is first formed, variation arisen after electric power is consumed in battery modules 20 leads to variation in SOC as shown in FIGS. 4(a) and (b).

Figure 5:
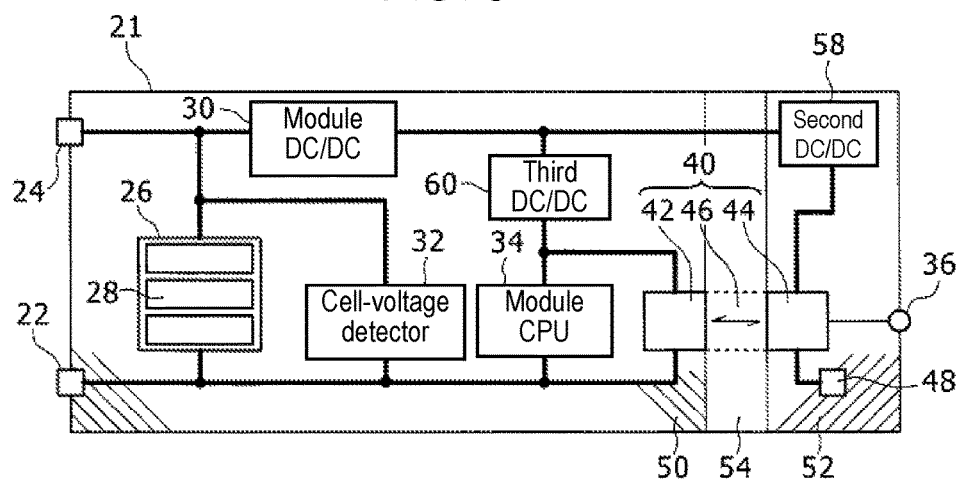
FIG. 5 is a configuration diagram of a conventional battery module.

FIG. 5 is a configuration diagram of conventional battery module 21. Conventionally, electric power to be consumed in module-side circuit elements in battery module 21 is fully covered by using part of electric power supplied from secondary battery 26 in battery module 21. When compared with FIG. 2, neither electric power input terminal 56 nor backflow preventing device 62 is provided, and electric power output from module DC/DC 30 is supplied via second DC/DC 58 and third DC/DC 60 to module CPU 34 and module-side insulating circuit 40. Electric power is supplied from secondary battery 26 to cell-voltage detector 32 without going through module DC/DC 30.

Figure 6:
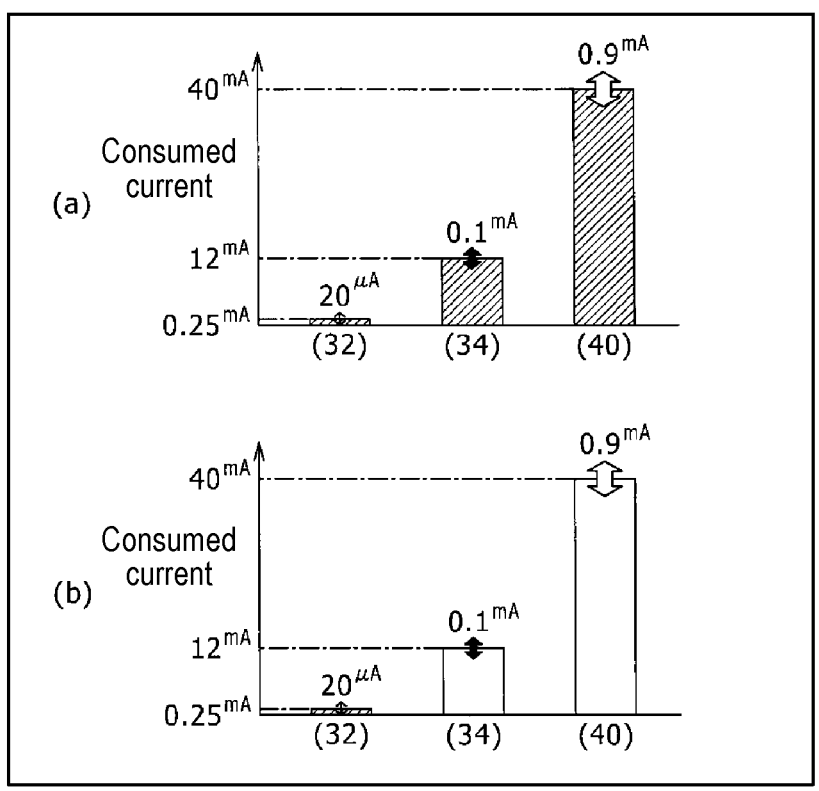
FIG. 6 is a graph illustrating an effect of the storage-battery control system according to the exemplary embodiment of the present invention, when compared with an effect of a conventional art, in which the section (a) of FIG. 6 is a graph illustrating with shaded areas electric power values consumed in a conventional battery module, and the section (b) of FIG. 6 is a graph illustrating with a shaded area electric power values consumed in the battery module configured as shown in FIG. 3.

FIG. 6 are graphs each illustrating amounts of electric power values consumed in circuit elements in battery module 20, as well as illustrating amounts of variation. In each graph, module-side circuit elements that consume electric power in battery module 20 are arranged on a horizontal axis, while amounts of electric power values consumed in the module-side circuit elements are arranged on a vertical axis. The module-side circuit elements that consume electric power in battery module 20 are cell-voltage detector 32, module CPU 34, and module-side insulating circuit 40. As for the consumed electric power values, amounts of variation between the plurality of battery modules 20 are shown.

FIG. 6(a) The section (a) of FIG. 6 is a graph of electric power values consumed in the module-side circuit elements in conventional battery module 21 shown in FIG. 5. As shown in the section (a) of FIG. 6, an electric power value consumed in module-side insulating circuit 40 is 40 mA, i.e., the largest value, and an amount of variation is 0.9 mA, i.e., the largest value as well. Module CPU 34 has the next larger power consumption value of 12 mA. An amount of variation is 0.1 mA. Cell-voltage detector 32 has the smallest power consumption value of 0.25 mA. An amount of variation is 20 µA. In conventional battery module 21 as described in FIG. 5, the total of these electric power values consumed in the circuit elements, i.e., (40 mA+12 mA+0.25 mA)=52.25 mA, is fully covered by secondary battery 26 in battery module 21. To illustrate the above description, bar graphs showing electric power values consumed in cell-voltage detector 32, module CPU 34, and module-side insulating circuit 40 are shaded. An electric power value that battery module 20 can output is thus reduced by an amount equivalent to 52.25 mA.

The total amount of variation in 52.25 mA is (0.9 mA+0.1 mA+20 µA)=1.02 mA, which means that variation can be observed in 20 battery modules 20 configuring storage battery unit 12 shown in FIG. 1. This is one of causes of variation in SOC in battery modules 20.

The section (b) of FIG. 6 is a graph of electric power values consumed in module-side circuit elements in battery module 20 configured as shown in FIG. 3. Vertical and horizontal axes are identical to those in the section (a) of FIG. 6. The electric power values consumed in the module-side circuit elements and amounts of variation are also identical to those shown in the section (a) of FIG. 6. A difference is that, in battery module 20, secondary battery 26 in battery module 20 only supplies electric power to cell-voltage detector 32, while controller 70 collectively supplies electric power to module CPU 34 and module-side insulating circuit 40. To illustrate the above description, only a bar graph showing an electric power value consumed in cell-voltage detector 32 is shaded.

An electric power value consumed in cell-voltage detector 32 is 0.25 mA. An electric power value that battery module 20 can output is reduced by an amount equivalent to 0.25 mA. When compared with the conventional art shown in the section (a) of FIG. 6, an amount is only (0.25 mA/52.25 mA)×100%=0.5% (fractions are rounded up).

An amount of variation in the electric power value consumed in cell-voltage detector 32 is 20 µA. When compared with the conventional art shown in the section (a) of FIG. 6, an amount of variation is only (0.02 mA/1.02 mA)×100%=2% (fractions are rounded up).

If variation in SOC between battery modules 20 configuring storage battery unit 12 is estimated based on the result obtained as described above, a period required for the variation in SOC to settle to approximately 1% is approximately 13 years. That is, according to the above-described configuration, variation in SOC between battery modules 20 can be reduced without using the method, as described in PTL 1, through which an external resistor is used to consume electric power of battery modules 20.

Figure 7:
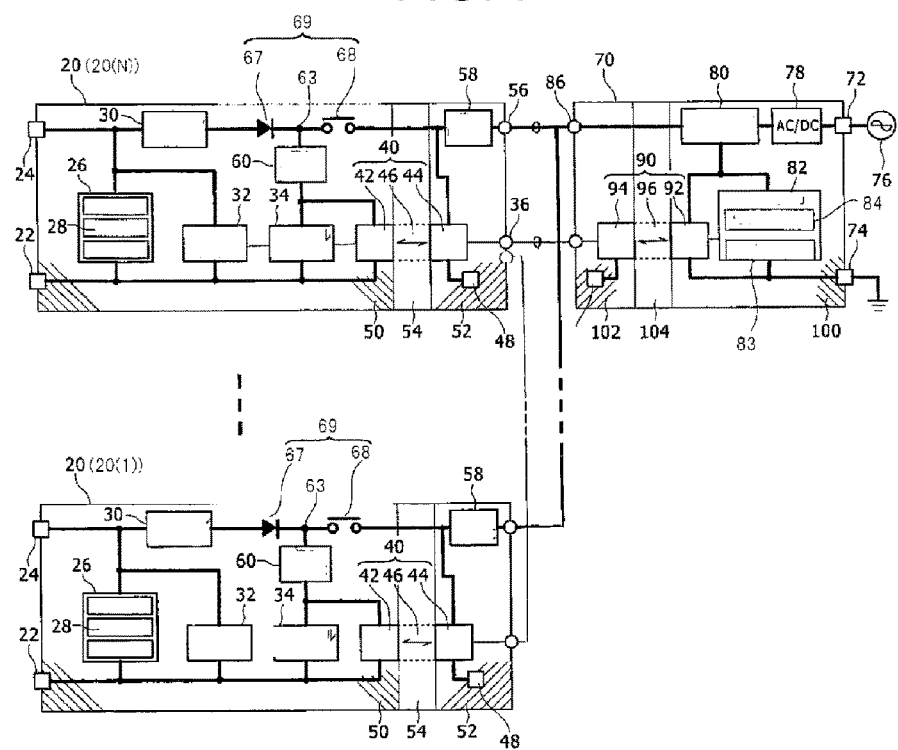
FIG. 7 is a configuration diagram illustrating configurations of circuits each having a function for switching a power supply to predetermined module circuit elements in each of the battery modules in the storage-battery control system according to the present invention.

FIG. 7 is a configuration diagram illustrating a circuit configuration having a power supply switching function for switching a power supply to predetermined module circuit elements in discharge-target battery module 20 from a power supply for controller 70 to secondary battery 26 in battery module 20 itself. A circuit diagram shown in FIG. 7 illustrates, among the plurality of battery modules 20 coupled in series, battery module 20(N) having the highest voltage and battery module 20(1) having the lowest voltage (see FIG. 1).

The plurality of battery modules 20 each has a substantially identical circuit configuration, excluding a coupling (daisy-chain coupling) state in module-side insulating circuit 40 for exchanging various data and control signals with controller 70.

In FIG. 7, with coupling point 63 coupling an output of module DC/DC 30 and an output of second DC/DC 58 interposed, one diode 67 with a cathode coupled to coupling point 63 is coupled to the output side of module DC/DC 30, instead of module-side rectifying device 64 configured by two diodes coupled in series in FIG. 2, and relay 68 is coupled to the output side of second DC/DC 58, instead of controller-side rectifying device 66 configured by one diode 67 in FIG. 2.

In battery modules 20 (20(N) and 20(1)), a voltage output from module DC/DC 30 and a voltage output from second DC/DC 58 are substantially identical (including a voltage difference due to an error), and, when a conducting voltage of a diode coupled to the output side of module DC/DC 30 causes a contact of relay 68 to close, controller 70 supplies electric power to third DC/DC 60, module CPU 34, and primary circuit unit 42 of module-side insulating circuit 40 (predetermined module-side circuit elements in battery module 20). On the other hand, when the contact of relay 68 opens, a voltage output from module DC/DC 30 is applied to coupling point 63, thus secondary battery 26 in battery module 20 itself supplies electric power to third DC/DC 60, module CPU 34, and primary circuit unit 42 of module-side insulating circuit 40. That is, diode 67 and relay 68 configure power supply path switching circuit 69 where, upon the contact of relay 68 closes, a path for supplying electric power from controller 70 via second DC/DC circuit 58 to predetermined module-side circuit elements in battery module 20 is formed, and, upon the contact of relay 68 opens, a path for supplying electric power from secondary battery 26 in battery module 20 itself via module DC/DC 30 to the predetermined module-side circuit elements in battery module 20 is formed. The predetermined module-side circuit elements in battery module 20 are therefore supplied with electric power from controller 70 upon the contact of relay 68 closes, or from secondary battery 26 in battery module 20 itself upon the contact of relay 68 opens.

On the other hand, controller 70 receives data on a cell voltage detected by cell-voltage detector 32 incorporated in each of battery modules 20 via each of module-side insulating circuits 40 and controller-side insulating circuits 90. Controller 70 has a function for detecting voltages (module voltages) in battery modules 20 based on cell voltages detected by cell-voltage detectors 32 in battery modules 20. Controller CPU 82 in controller 70 includes equalizing controller 83 for executing an equalizing process for reducing a difference in module voltage in battery modules 20, and power supply switching controller 84 for opening and closing a contact of relay 68 based on a control of equalizing controller 83.

Among battery modules 20 each having a module voltage, equalizing controller 83 selects, for example, one battery module 20 having the highest module voltage as a discharge-target.

Among module voltages in battery modules 20, for example, equalizing controller 83 sets the lowest module voltage as a target value, and detects a voltage difference between the highest module voltage selected as the discharge-target and the target value. When the voltage difference between the highest module voltage and the target value is equal to or above a predetermined threshold, equalizing controller 83 sets battery module 20 having the highest module voltage as a discharge-target, and urges discharge-target battery module 20 to discharge electricity so that its amount of discharge is greater than amounts of discharge from other battery modules 20.

Once equalizing controller 83 executes such an equalizing process, a contact of relay 68 in discharge-target battery module 20 opens. While no equalizing process is executed, all contacts of relays 68 in battery modules 20 are closed, thus controller 70 supplies electric power to all predetermined module-side circuit elements in battery modules 20. When the equalizing process is executed, and a contact of relay 68 in discharge-target battery module 20 opens, secondary battery 26 in discharge-target battery module 20 itself supplies electric power to predetermined module-side circuit elements in discharge-target battery module 20. That is, in discharge-target battery module 20, a power supply to predetermined module-side circuit elements in battery module 20 is switched from a power supply to controller 70 to secondary battery 26 in battery module 20 itself, as well as, in battery modules 20 other than the discharge-target, the power supply to controller 70 continuously supplies electric power to predetermined module-side circuit elements in battery modules 20 other than the discharge-target, thus the equalizing process is executed.

Discharge-target battery module 20 therefore further consumes more electric power in secondary battery 26 in battery module 20 itself, than electric power consumed by battery modules 20 other than the discharge-target so that a module voltage in discharge-target battery module 20 and module voltages in battery modules 20 other than the discharge-target come close each other. The module voltage in discharge-target battery module 20 soon reaches the target voltage, thus an imbalance in stored electric charge between secondary batteries 26 in battery modules 20 can be reduced. More electric power in secondary battery 26 in battery module 20 having a highest module voltage is therefore consumed than electric power in other secondary batteries 26 in battery modules 20, thus an imbalance in module voltage between battery modules 20, i.e., an imbalance in stored electric charge between secondary batteries 26 in battery modules 20, can be reduced.

Secondary battery 26 in discharge-target battery module 20 is caused to discharge electricity through the equalizing process until the module voltage reaches the target value, for example.

In the above-described example, the lowest module voltage in one battery module 20 is selected from among module voltages in battery modules 20, and is set as a target value. However, a target value is not limited to this example. The target value may be another module voltage excluding the highest module voltage, or may be an average module voltage.

A target voltage aimed when discharge-target secondary battery 26 discharges electricity is not limited to an identical target value. The discharge-target may be another module voltage excluding the highest module voltage, or may be an average module voltage.

It is advantageous that discharge-target battery module 20 is stored in a nonvolatile memory (not shown) installed in controller 70 so that, even when controller 70 is turned off, and then turned on again, equalizing controller 83 increases internal circuits in number for consuming electric power to further and continuously consume electric power in discharge-target battery module 20, until a module voltage in discharge-target battery module 20 reaches a target voltage. However, discharge-target battery module 20 may be detected each time controller 70 is turned on to urge equalizing controller 83 to cause elements to consume electric power in discharge-target battery module 20.

In the above-described example, equalizing controller 83 uses a voltage value as a target value and a threshold for selecting discharge-target battery module 20 to execute the equalizing process. However, such a value is not limited to a voltage value, but an SOC value may be used.

The above-described exemplary embodiment is intended to facilitate understanding of the present invention, and is not intended to limit an interpretation of the present invention. In FIG. 7, a configuration, where one diode 67 with a cathode coupled to coupling point 63 is coupled to the output side of module DC/DC 30, and relay 68 is coupled to the output side of second DC/DC 58, switches a power supply to predetermined module-side circuit elements in battery module 20, i.e., third DC/DC 60, module CPU 34, and primary circuit unit 42 of module-side insulating circuit 40, between a power supply to controller 70 and secondary battery 26 in battery module 20 itself. However, a circuit for switching a power supply is not limited to the exemplary embodiment shown in FIG. 7, but such a circuit can be achieved through various configurations.

Figure 8:
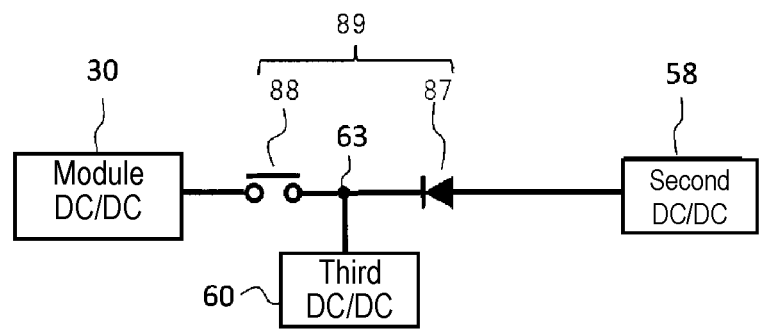
FIG. 8 is a configuration diagram illustrating another example, different from FIG. 7, of a configuration for switching an electric power supply path to predetermined module circuit elements in a battery module.

FIG. 8 shows an example configuration of power supply path switching circuit 89 for switching an electric power supply path to predetermined module circuit elements in a battery module, which differs from the configuration shown in FIG. 7, in particular, a coupling between relay 88 and diode 87 differs from a coupling shown in FIG. 7. A circuit shown in FIG. 8 is configured to couple a relay between an output end of module DC/DC 30 and coupling point 63, as well as one diode with a cathode coupled to coupling point 63 is coupled to the output side of second DC/DC 58. Components not shown in FIG. 8 are identical to components shown in FIG. 7. To execute the equalizing process, similarly to FIG. 7, relay 88 is controlled to open or close to switch a power supply to predetermined module-side circuit elements in battery module 20, i.e., third DC/DC 60, module CPU 34, and primary circuit unit 42 of module-side insulating circuit 40, between a power supply to controller 70 and secondary battery 26 in battery module 20 itself. In FIG. 8, the equalizing process is executed while relay 88 in battery module 20 other than the discharge-target is open, while a relay in discharge-target battery module 20 is closed.

The present invention can be altered, modified, and improved within the scope of the present invention. The present invention includes its equivalents.

A storage-battery control system according to the present invention is applicable to industrial or household power storage systems.

The invention claimed is:

1. A storage-battery control system comprising:
a battery module constituting a storage battery unit configured to output a predetermined high voltage value;
a controller;
an insulating communication unit configured to couple the battery module and the controller; and
a power supply line,
wherein the battery module includes a secondary battery for outputting a module voltage value, a module-side voltage converter for converting a voltage value of the secondary battery into a module-side predetermined operation voltage value, and a module-side circuit element that operates at the module-side predetermined operation voltage value,
the controller includes a low voltage power supply unit, a controller-side voltage converter for converting a voltage of the low voltage power supply unit into a controller-side predetermined operation voltage value, and a controller-side insulating circuit having a floating reference potential point insulated from a controller reference potential point for the low voltage power supply unit to couple the controller and the insulating communication unit,
the power supply line supplies electric power output from the controller-side voltage converter to the battery module,
an output side of the module-side voltage converter and an output side of the controller-side voltage converter are coupled to each other via a predetermined backflow preventing device, and the module-side circuit element that operates at the module-side predetermined operation voltage value is supplied with electric power from a coupling point, and
the predetermined backflow preventing device includes a module-side rectifying device having an anode coupled to the output side of the module-side voltage converter and a cathode coupled to the coupling point, and a controller-side rectifying device having an anode coupled to the output side of the controller-side voltage converter and a cathode coupled to the coupling point.

2. The storage-battery control system according to claim 1, wherein the storage battery unit includes a plurality of the battery modules coupled to each other in series, and the electric power output from the controller-side voltage converter is supplied to each of the plurality of battery modules.

* * * * *